UNITED STATES PATENT OFFICE.

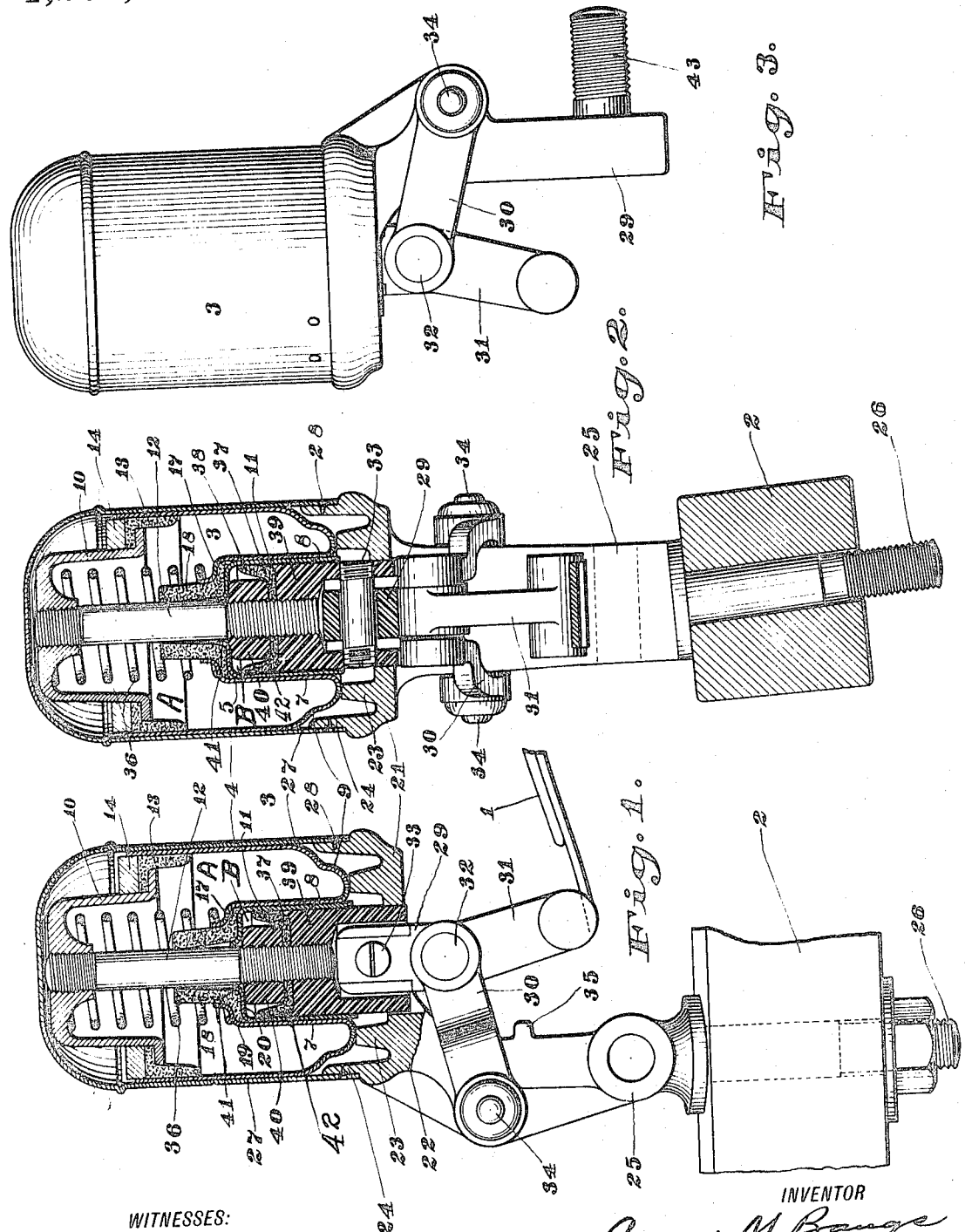

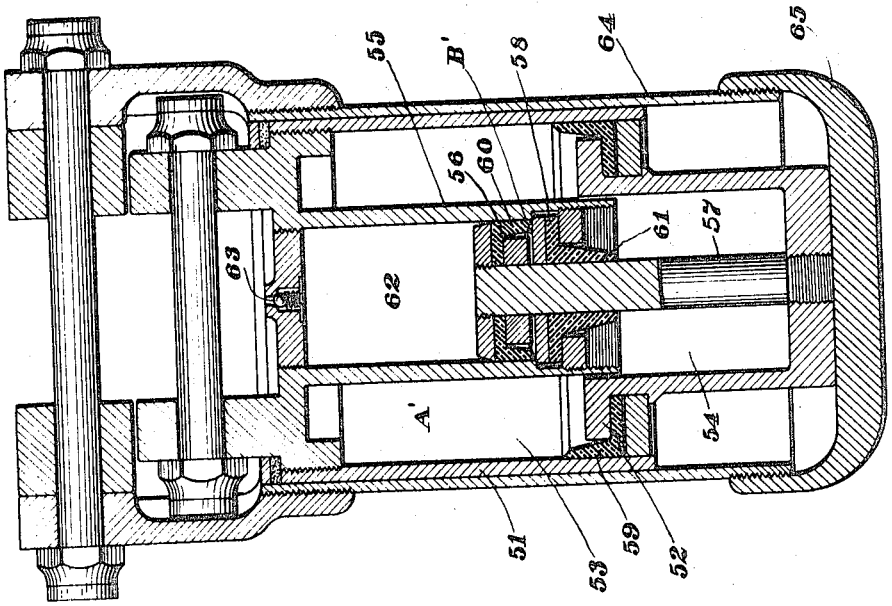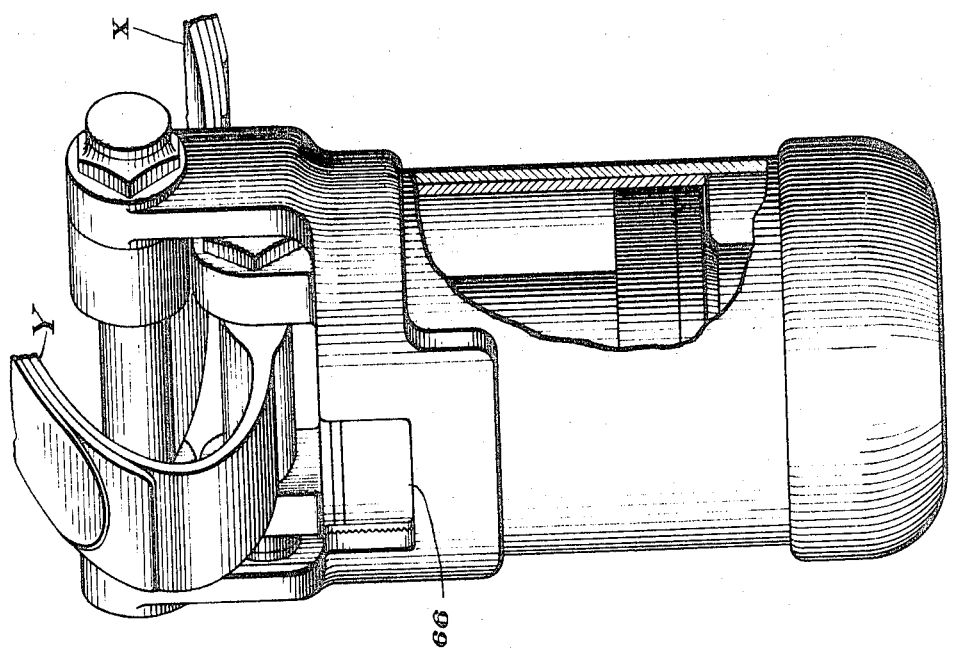

ANSON M. BANGS, OF NEW YORK, N. Y.

SHOCK-ABSORBER.

1,289,081.    Specification of Letters Patent.    Patented Dec. 31, 1918.

Application filed March 10, 1916. Serial No. 83,212.

*To all whom it may concern:*

Be it known that I, ANSON M. BANGS, a citizen of the United States, and a resident of the borough of Manhattan, city of New York, county and State of New York, have invented certain new and useful Improvements Relating to Shock-Absorbers, of which the following is a specification.

This invention relates to shock absorbers which are placed between the underframe and body of a vehicle and one object of the invention is to provide a construction in which an elastic fluid, air, is contained in a compression cylinder and the pressure in the chamber within said cylinder is maintained by a pump which is automatically actuated as the shock absorber comes into play.

The shock absorber embodying my invention preferably comprises a yielding means having a compression cylinder, a coöperating piston within said compression cylinder, an air-pump cylinder, a coöperating piston within said air-pump cylinder and a connection between said pistons so that they must move together. These pistons are preferably arranged in tandem and the pump piston is directly connected, for instance, to a body supporting spring while the compression cylinder may be connected, for example, to a member or part of the underframe of the vehicle. In other words, the pump piston and compression cylinder are connected between the underframe and the body of a vehicle. It will be noted, however, that in some embodiments of the invention the compression cylinder might be the part which would be directly connected to the body and the pump piston might be the part which would be directly connected to the underframe, but this would amount to a mere reversal of parts.

As showing a specific embodiment of the invention reference is made to the drawing forming a part of this specification, in which drawing, Figure 1 represents a vertical sectional view of the shock absorber showing a portion of one of the body supporting springs to which it is connected and also a portion of the underframe to which it is connected. This is a view looking at the shock absorber from one side.

Fig. 2 is a vertical sectional view of the shock absorber and in this view a portion of the spring and a portion of the underframe are shown in section. This is a view looking at the shock absorber from the rear. The particular shock absorber illustrated is one which is constructed for employment between the underframe and spring at one end of a Ford automobile.

Fig. 3 is a side view of a shock absorber which is particularly constructed for employment between the underframe and spring at the other end of a Ford automobile.

Figs. 4 and 5 are respectively a vertical sectional view and a perspective view, partially broken away, showing the invention embodied in a form somewhat different from that shown in Figs. 1 to 3 inclusive.

In Fig. 2 an end of the body supporting spring is indicated by 1, a member of the underframe by 2 and the shock absorber by 3. This shock absorber shown in Figs. 1 and 2 comprises a yielding means A and a pump B. The yielding means is frequently referred to as a compression chamber and has a compression cylinder member 4 and a coöperating compression piston member 10. The pump B has a pump cylinder member 5 and a coöperating pump piston member 11. The pump cylinder member 5 is centrally located with respect to the compression cylinder member 4 and therefore these cylinders are concentric with each other. They are also secured together, thus constituting a set of connected cylinders. The pump cylinder in effect comprises a shell 7—the outer shell of the pump cylinder—and an inner or lining portion 8 that fits the shell 7. The outer shell 7 of the pump cylinder is integral or otherwise connected with the compression cylinder, as by the curved portion 9. There is located within the compression cylinder the piston 10 heretofore referred to. The compression piston 10 and the pump piston 11 are connected in tandem by the piston rod 12, thus forming a set of connected pistons. The compression piston 10 is provided with a depending flexible washer or packing 13 which is arranged so as to expose the leakage of air from the compression chamber through the space between the compression piston and the compression cylinder as the pump moves upwardly. The rod 12 extends through the head 17 of the pump and there is secured to the head of the pump and arranged so as to engage the rod 12 the upstanding packing or washer 18. This packing is arranged so as to oppose a flow of air from the compression chamber to the pump as the compression piston moves downwardly, but so as to permit a flow of air from the pump chamber to the compression chamber when the compression chamber is increasing in volume and while the pump chamber is decreasing in volume, that is when the pump is operating or pumping. This packing 18 is clamped in place between the portion 19 of the outer shell 7 and the portion 20 of the inner portion or lining of the pump cylinder 5. The outer shell 7 of the pump cylinder and the inner or lining portion of the pump cylinder are secured together when in packing clamping position in any suitable manner, as for instance by soldering, brazing, spot-welding or the like, or even by a screw connection.

The compression cylinder 4 is supported on a member 21 which is secured to the underframe. This member 21 is preferably of cast steel and comprises a bracket 22 which has a seat 23 and an upstanding flange 24, and a bolt 25 which depends from the bracket by which bolt the bracket is carried. The bolt is secured in place upon the underframe, as by means of a nut 25, and therefore the member 21 is properly secured so that it can serve its function as a cylinder supporting member. The cylinder is maintained in place on the supporting member 21 by means of a cover 27 which is secured in place by screws 28 that pass through the cover 27 into the upstanding flange 24. The cover 27 and the supporting member 21 together coöperate to form a casing for inclosing the operative parts of the shock absorber. The upper part of the shell and the upper portion of the compression piston define a chamber in which air is entrapped, thus serving to cushion to a certain extent the upward movement of said piston. This chamber is called the rebound chamber. The spring 1 is connected—but not directly—to the pump piston 11 since allowance must be made for the movement of the ends of the spring as the latter operates and therefore a connecting means is provided which comprises depending links 29, 30 and 31. One end of each of these links is connected to a common pivot pin 32 while the upper end of the link 29 has a pivoted connection—a screw connection—at 33 to the pump piston; the other end of the link 30 is pivotally connected at 34 to the bracket member or cylinder supporting member 21, and the lower end of the link 31 is pivotally connected to the spring 1 by any suitable pin or bolt.

From an inspection of the drawings it will be observed that the force due to the weight of the spring 1 is first received by the link 31; from that link it is transmitted through the medium of the pivot pin 32 to the link 29; thence through the medium of the pin at 33 to the pump piston, to the piston rod 12 and finally to the piston 10 in the compression cylinder.

In order that there will not be any damage imparted to the various mechanisms by an excess movement of the pistons within the cylinders a suitable stop is provided, as at 35 on the bracket member 21. This stop is positioned so as to be engaged by the movable link 30 and thus limit the downward movement of the pistons and also the downward movement of the end of the spring 1. A spring 36 may also be provided between the upper side of the head of the pump cylinder and the under side of the piston within the compression cylinder so as to tend to restore the latter to its elevated position in the compressed cylinder.

It is possible that with the arrangement of the parts such as shown the air within the compression cylinder might leak out, especially if the weight upon the piston within the compression cylinder is allowed to remain an indefinite length of time without an up and down movement having been imparted to the pistons whereby the pump will operate to supply air to the compression cylinder. Such loss of pressure, however, is not objectionable for the reason that with the ordinary jolting of a car which is encountered in actual practice a sufficient movement will be imparted to the pistons which are connected to the end of the spring so that the pump will immediately start supplying air under pressure to the interior of the compression chamber when the vehicle is in use.

The piston of the pump cylinder has a cup-shaped washer or packing 37 with an upstanding flange 38 and this washer is secured in place on the body portion 39 of the piston by means of a lock-nut 40.

It will also be observed from an inspection of Figs. 1 and 2 that the upstanding packing or washer 18 is supported so that the lower inner portion thereof will be maintained in the form of a curve by means of an upwardly extending portion 41 which is on the lining 8 of the pump cylinder; likewise the outer lower corner or portion of the packing 37 is maintained in a curved form, by means of an upstanding portion 42 that is on the body portion 39 of the pump piston.

The shock absorber which is shown in Fig. 3 is the same in its mode of operation as the shock absorber shown in Figs. 1 and 2, but it has been modified so that the screw that secures in place the bracket or cylinder supporting member extends laterally instead of downwardly. This laterally extending screw just referred to is designated by the reference character 43.

The shock absorber as shown has been applied directly to the end of a spring but it will be manifest that this connection to the spring could be omitted and the shock absorber could be applied to some other member that is on the body of a vehicle. For this reason the spring will be referred to as a body member.

The shock absorber as illustrated in Figs. 1 to 3 inclusive is of a form designed specifically for use on Ford automobiles. It will be manifest, however, that the invention can be embodied in shock absorbers suitable for use on all forms of vehicles between the wheels or underframes carried on the wheels on the one hand and the body of the vehicle on the other. To illustrate another form in which the invention may be embodied reference may be made to the combination shown in Figs. 4 and 5.

The shock absorber shown in the figures last mentioned is secured in place between a spring X that may be considered a part of the underframe and a spring Y that may be considered a part of the body since the springs just referred to are respectively the springs that are secured to the underframe and body of a vehicle. The shock absorber shown in Figs. 4 and 5 comprises a yielding means A' and a pump B' which are similar in their function and mode of operation to the yielding means and pump shown and described in connection with the structure illustrated in Figs. 1, 2 and 3.

The yielding means A', or compression chamber as it is frequently called, has a compression cylinder member 51 and coöperating therewith a compression piston member 52. It will here be noted that the elastic fluid, to wit, the air which is entrapped within the yielding means is located within the spaces marked 53 and also 54, the space 54 being the space that is provided within the compression piston member so as to allow room for the cylinder member 55 of the pump. The pump B has not only the cylinder member 55 just referred to but also the coöperating pump piston 56.

It will here be noted that the compression cylinder 51 and the pump cylinder 55 are connected, so that the two must move together, thus constituting a set of connected cylinders. Likewise the compression piston and the pump piston are connected into a set through the medium of the piston rod 57 that passes through the head 58 of the pump. The compression piston 52 is provided with a washer or packing 59 arranged to oppose the flow of entrapped air from within the yielding means as the yielding means is being compressed by the movement of the body and the underframe toward each other.

It will be observed from an inspection of Fig. 5 that when the body member and underframe approach each other, due to the specific arrangement and connection of the spring, the ends of the springs which are the parts directly connected to the shock absorber move away from each other, even though the body and underframe move toward each other. The pump is provided with a packing 60 which is arranged to force air from within the pump into the yielding means A' as the body and underframe move away from each other; in other words, as the ends of the springs that are directly connected to the shock absorber shown in Fig. 5 move toward each other. The air is allowed to flow from within the pump B' through the head 58 past the washer 61 which is arranged so as to permit flow from the pump into the yielding means, but also so as to oppose the flow from the yielding means into the pump. The air within the chamber 62 is entrapped by means of the check valve 63 whereby as the pump piston 56 moves away from the head 58 air will be forced past the washer or packing 60 whereby the air can finally be forced by the pump into the yielding means as the pump operates.

The shock absorber shown in Figs. 4 and 5 has a casing 64. The set of connected pistons rest upon the lower head 65 of this casing or they may even be secured to said head. The cylinder 51 is slidable within the shell of the casing 64. This casing is preferably cut out as 66 to allow room for the lower end of the spring Y as the ends of the springs X and Y move away from each other.

From what has preceded it will be noted that the head of the pump shown in Figs. 1 and 2 carries the packing or washer 18 which fits the rod 12 that connects the piston of the pump to the piston within the compression chamber. This packing 18 serves as a valve which, as previously described, permits the flow of air from the pump to the interior of the compression chamber but opposes the flow of air from the compression chamber into the pump. The head that carries this packing or washer serves to provide not only a head for the pump but also a part of the structure which constitutes the compression chamber. It is therefore proper to refer to this head as a member of the compression chamber since it is a member that is common to both the pump and the compression chamber; in fact said head may be called either a pump member or a compression chamber member.

Considering the rod 12 as a pump member, since it may be referred to as the piston rod for the pump piston, it will be observed that the packing or washer 18 provides in effect a valve member which is common to a pump member, to wit the rod 12 on the one hand, and a compression chamber member, to wit said head on the other.

It will also be observed that the pump member, to wit the rod 12, moves relatively to the compression chamber member, to wit said head, and that said packing or washer during said movement performs the valve function described; in other words, when the compression chamber is expanding the pump is decreasing in volume and air is being forced from the pump along the piston rod 12 past the packing 18 into the compression chamber, but when the compression chamber is contracting and the pump is expanding in volume the washer 18 is serving as a valve to oppose the flow of any air from the compression chamber into the pump chamber.

The statement made in regard to packing or washer 18 shown in Figs. 1 and 2 being a valve member which is common to a compression chamber member and a pump member applies to the packing or washer 61 shown in Fig. 4.

The improvements herein set forth are not limited to the precise construction and arrangement shown and described for they may be embodied in various forms and modifications without departing from the spirit and scope of the invention.

What I claim is:

1. A vehicle having between the underframe and body thereof a cylinder-supporting member, a compression cylinder carried by said member, a compression piston which fits and slidably engages said compression cylinder so as to provide a part of an expanding and contracting compression chamber, a pump cylinder, a pump piston which fits and slidably engages said pump cylinder so as to provide a part of an expanding and contracting pump, a member connecting said pistons, and a washer engaging said connecting member, which washer is shaped so as to oppose the flow of air from the compression chamber to the pump but so as to permit the flow of air from the pump along said connecting member past said washer into the compression chamber.

2. In combination, a frame member, a body member, and a shock absorber comprising a yielding means which permits the frame member and the body member to move toward and from each other and an air pump, the yielding means comprising a compression chamber member and a compression piston member that serve to define a compression chamber and which are respectively connected to the body member and the frame member, the pump comprising a pump cylinder member and pump piston member connected respectively to the body member and the frame member, the construction being such that as the compression piston member moves to increase the volume within the compression chamber the pump piston member moves inwardly relative to its cylinder member, the construction also being such that all of the air as it is pumped is forced into the compression chamber when the compression piston member is moving in a manner to increase the volume in said compression chamber, said shock absorber also having a connecting member which connects one of said compression chamber members to one of said pump members and a packing or washer that has a sliding engagement with said connecting member as the compression chamber changes in volume, which packing is constructed so as to oppose the flow of air from the compression chamber to the pump but so as to permit the flow of air from the pump along said connecting member past the packing into the compression chamber.

3. In combination, a frame member, a body member, and a shock absorber comprising a yielding means which permits the frame member and the body member to move toward and from each other and an air pump, the yielding means comprising a compression cylinder member and a compression piston member that serve to define a compression chamber and which are respectively connected to the body member and the frame member, the pump comprising a pump cylinder member and a pump piston member connected respectively to the body member and the frame member, said shock absorber having a connecting member which connects one of said compression chamber members to one of said pump members and also a packing or washer that has a sliding engagement with said connecting member as the compression chamber changes in volume, which packing is constructed so as to oppose the flow of air from the compression chamber to the pump but so as to permit the flow of air from the pump along said connecting member past the packing into the compression chamber.

4. In combination, a frame member, a spring member constituting a part of a body, a compression cylinder, a piston in said compression cylinder which compression cylinder and piston provide a compression chamber, a pump cylinder connected to said compression cylinder, a piston in said pump cylinder, which pump cylinder and pump piston provide a pump, a rod connecting said pump piston and said compression piston, said pump having a cylinder head through which said rod passes, and a packing or washer secured to said head and surrounding said rod, which packing or washer is constructed so as to provide a valve which permits flow of air from the pump along the rod past the packing or washer into the compression chamber but which opposes a reverse flow, the cylinders being connected to the frame member and the pistons being connected to the spring member.

5. In combination, a shock absorber which has a movable member connected to a body spring and a relatively stationary member connected to an underframe, the shock absorber comprising a compression cylinder, a coöperating piston within said compression cylinder, a pump cylinder, a coöperating piston within said pump cylinder, a rod connecting said pistons so as to form one set of connected members, a packing surrounding said rod and arranged so as to permit a flow from the interior of the pump to the interior of the compression cylinder, the cylinders being connected so as to form a second set of connected members, the construction being such that one of said sets of connected members constitutes the stationary member which is connected to the frame and the other of said sets of connected members constitutes the movable member which is connected to the body spring.

6. A vehicle having between the underframe and body thereof a shock absorber comprising in combination a bracket or cylinder supporting member, a compression cylinder carried by said bracket member, a compression piston located within said compression cylinder, a pump cylinder connected to the compression cylinder, a pump piston located within said pump cylinder, a rod for connecting said pistons, and means for connecting said pistons to the body or underframe of a vehicle, the construction being such that when the underframe and body portion are moving toward each other the compression chamber within the compression cylinder is decreasing in volume and the pump is not pumping and so that when the underframe and body portion are moving from each other said compression chamber is increasing in volume and the pump is forcing air into the compression chamber.

7. A shock absorber between the under frame and body of a vehicle which shock absorber comprises a compression chamber having a compression cylinder member and a coöperating piston member one of which members is connected to the underframe and the other of which members is connected to the body, said shock absorber having a pump comprising a cylinder member and a coöperating piston member one of which last mentioned members in connected to the underframe and the other of which is connected to the body, the compression chamber being constructed so as to serve as a cushion when the body and underframe approach each other and the pump being constructed and arranged so that it will pump fluid into the compression cylinder of the yielding means when the body and the underframe to which the pump members are attached move away from each other, said shock absorber having between a member of the pump and a member of the compression chamber a valve member in the form of a packing that is shaped so as to permit a flow of air from the pump into the compression chamber but so as to oppose the flow of air tending to pass from the compression chamber into the pump.

8. A shock absorber for use between the underframe and body of a vehicle, which shock absorber comprises a compression cylinder member, a coöperating piston member a pump cylinder member and a coöperating pump piston member, said cylinder members being connected into one set and said piston members being connected in another set whereby when one set of said members is connected to an underframe member and the other set of members is connected to a body member, the compression cylinder and piston will serve as a yielding means as the body and underframe approach each other and the pump will serve to force air into the compression cylinder as the underframe and body move from each other, the connected cylinder members having thereupon a washer which has a sliding engagement with the member connecting the pistons, which washer is shaped so as to serve as a valve that permits a flow of air from the pump along the connecting member past the washer into the compression cylinder but that opposes any flow from the compression cylinder past the valve into the pump.

9. In a vehicle between the underframe and body thereof a shock absorber comprising in combination yielding means having a compression cylinder, a coöperating compression piston and a pump having a cylinder connected to the compression cylinder and a piston connected to the compression piston by means of a rod which passes through the head of the pump cylinder and which head is provided with a valve so constructed and arranged that as said head and pump piston approach each other air will be forced from the pump into the compression cylinder.

10. In combination with the underframe and body of a vehicle a shock absorber comprising yielding means and a pump, which yielding means has a compression cylinder member and a coöperating compression piston member, one of which members is connected to the underframe and the other of which members is connected to the body, the pump having a pump cylinder member and pump piston member, one of which members is connected to the underframe and the other of which is connected to the body, the shock absorber being provided with a compression valve which is common to a compression member and a pump member that is movable relative to the compression member, which valve and said members to which it is common being so constructed and arranged that as the body and underframe move away from each other air will be forced by the pump into the compression cylinder, but so that as the underframe and body move toward each other the flow of air from the yielding means into the pump will be opposed by said valve.

11. A shock absorber of the class described comprising in combination a compression cylinder, a member supporting said compression cylinder which member has means for connecting it to the underframe of a vehicle, a compression piston slidably associated with said compression cylinder, a pump cylinder connected to said compression cylinder, a pump piston slidably associated with said pump cylinder, which pump piston is connected to the compression piston, and means comprising a link for connecting the pump piston to a body member of a vehicle.

12. A shock absorber of the class described comprising in combination a combined compression chamber and pump which shock absorber is provided with a bracket member supporting stationary members of the combined compression chamber and pump, said bracket member also having means for securing it to the underframe of a vehicle, the combined compression chamber and pump having movable members and means for connecting them to a body member of a vehicle, which means comprises a common pivot pin, a link extending from said movable members to said common pivot pin, a second link extending from said common pivot pin to said bracket member, and a third link extending from the common pivot pin to the body member of the vehicle to which it is connected.

13. A shock absorber of the class described comprising in combination an expansible and contractible compression chamber and a pump, means for supporting relatively stationary members of said compression chamber and pump and for securing them to the underframe of a vehicle, means for connecting the movable members of said compression chamber and pump to the body member of a vehicle, and a stop on said supporting means for limiting the movement of said movable members relative to the stationary members as the body member of the vehicle moves downwardly relative to the underframe of the vehicle.

This specification signed and witnessed this 8" day of March, A. D. 1916.

ANSON M. BANGS.

Signed in the presence of:
G. McGrann,
M. F. Keating.